(12) United States Patent
Bellows et al.

(10) Patent No.: US 8,370,842 B2
(45) Date of Patent: Feb. 5, 2013

(54) PORTIONING AND ROUTING OF WORK IN A MULTIPLE PROCESSOR SYSTEM

(75) Inventors: Gregory H. Bellows, Austin, TX (US);
Joaquín Madruga, Austin, TX (US);
Ross A. Mikosh, Austin, TX (US);
Barry L. Minor, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 501 days.

(21) Appl. No.: 12/649,958

(22) Filed: Dec. 30, 2009

(65) Prior Publication Data

US 2011/0161970 A1 Jun. 30, 2011

(51) Int. Cl.
*G06F 9/46* (2006.01)
(52) U.S. Cl. ...................................................... 718/103
(58) Field of Classification Search .................... 718/10, 718/103
See application file for complete search history.

(56) References Cited

U.S. PATENT DOCUMENTS 7,155,716 B2 * 12/2006 Hooman et al. ............... 718/102
2011/0010709 A1 * 1/2011 Anand et al. ...................... 718/1

* cited by examiner

*Primary Examiner* — Thomas Lee
*Assistant Examiner* — Xuxing Chen
(74) *Attorney, Agent, or Firm* — Yudell Isidore Ng Russell PLLC

(57) ABSTRACT

Disclosed are a method, a system and a computer program product of operating a data processing system that can include or be coupled to multiple processor cores. The multiple processor cores can be coupled to a memory that can include multiple priority queues associated with multiple respective priorities and store multiple work items. Work items stored in the multiple priority queues can be associated with a bit mask which is associated with a respective priority queue and can be routed to respective groups of one or more processors based on the associated bit mask. In one or more embodiments, at least two groups of processor cores can include at least one processor core that is common to both of the at least two groups of processor cores.

23 Claims, 10 Drawing Sheets

US 8,370,842 B2

PORTIONING AND ROUTING OF WORK IN A MULTIPLE PROCESSOR SYSTEM

BACKGROUND

1. Technical Field

Figure 1:
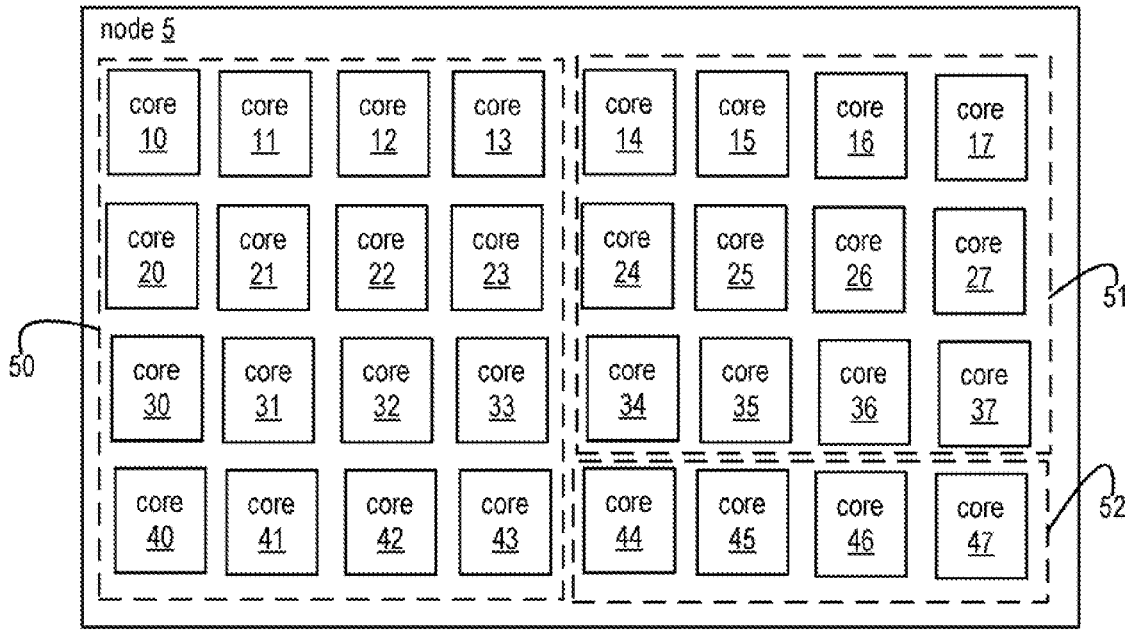

The present invention generally relates to multi-processor data processing systems and in particular to operations on data processing systems configured with multiple processing units. Still more particularly, the present invention relates to a method and system for completing parallel processing of distributed work across multiple processing units of a multi-core data processing system.

2. Description of the Related Art

Multi-core data processing systems are utilized to enable parallel processing of data that can be divided into portions for completion. In an attempt to divide and balance work loads on a single node or compute device, programs are written to portion or subdivide the single node or compute device. As shown in prior art FIG. 1, a single node or compute device is subdivided such that each portion includes one or more processing elements or processor cores in accordance with a first subdivision process or schema. As illustrated, node 5 can include cores 10-47 which are subdivided into subdivisions or subdevices 50-52, where subdevice 50 includes cores 10-13, 20-23, 30-33, and 40-43, subdevice 51 includes cores 14-17, 24-27, and 34-37, and subdevice 52 include cores 44-47. For example, subdevice 50 processes sound output, subdevice 51 processes video output, and subdevice 52 processes positions (e.g., processing positions of one or more objects). If more processing capabilities are needed in one processing area, node 5 must be re-portioned or re-subdivided to re-balance the workload. This can be accomplished by a program maintaining and re-portioning or re-subdividing node 5 into subdevices. As shown in prior art FIG. 2, node 5 is re-portioned or re-subdivided to re-balance the workload. As illustrated, subdevice 53 includes cores 10-14, 20-24, 30-34, and 40-44, subdevice 52 includes cores 15-17, 25-27, and 35-37, and subdevice 52 include cores 45-47. In one example, sound processing needs more processing capabilities, so cores are taken from other processes and re-distributed to sound processing. For instance, subdevice 53 processes sound output, subdevice 54 processes video output, and subdevice 55 processes positions. In the past, dynamic modification of managing subdevices has been difficult to implement.

SUMMARY

Disclosed are a method, computer system architecture, and computer program product of operating a data processing system that can include or be coupled to multiple processor cores. The multiple processor cores can be coupled to a memory that can include multiple priority queues associated with multiple respective priorities and store multiple work items. Work items stored in the multiple priority queues can be associated with a bit mask which is associated with a respective priority queue and can be routed to respective groups of one or more processors based on the associated bit mask. For example, each of multiple priority queues can respectively receive multiple work items, and work items in each of the priority queues can be associated with a bit mask. In one or more embodiments, the respective bit mask can be used to route the associated work items to a group of one or more processor cores. In one example, routing the work items associated with the respective bit mask to the group of one or more processor cores can include each processor core of the group retrieving the work items associated with the respective bit mask from a data structure stored in a memory. In another example, routing the work items associated with the respective bit mask to the group of one or more processor cores can include a processor or a processing core routing the work items associated with the respective bit mask to the group of one or more processor cores. In one or more embodiments, to the group of one or more processor cores can be referred to as a virtual compute device. In one or more embodiments, at least two groups of one or more processor cores can include at least one processor core that is common to both of the at least two groups.

The above summary is not intended as a comprehensive description of the claimed subject matter but, rather, is intended to provide a brief overview of some of the functionality associated therewith, according to one or more embodiments. Other systems, methods, functionality, features and advantages of the claimed subject matter will be or will become apparent to one with skill in the art upon examination of the following figures and detailed written description.

BRIEF DESCRIPTION OF THE OF THE SEVERAL VIEWS OF THE DRAWINGS

Figure 2:
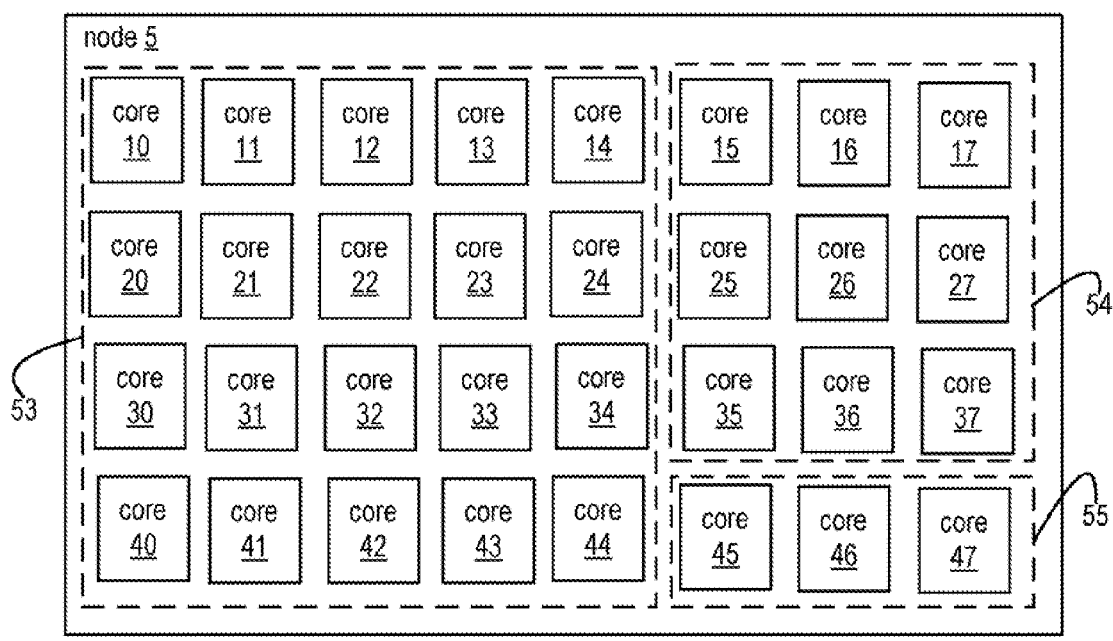
Figure 3:
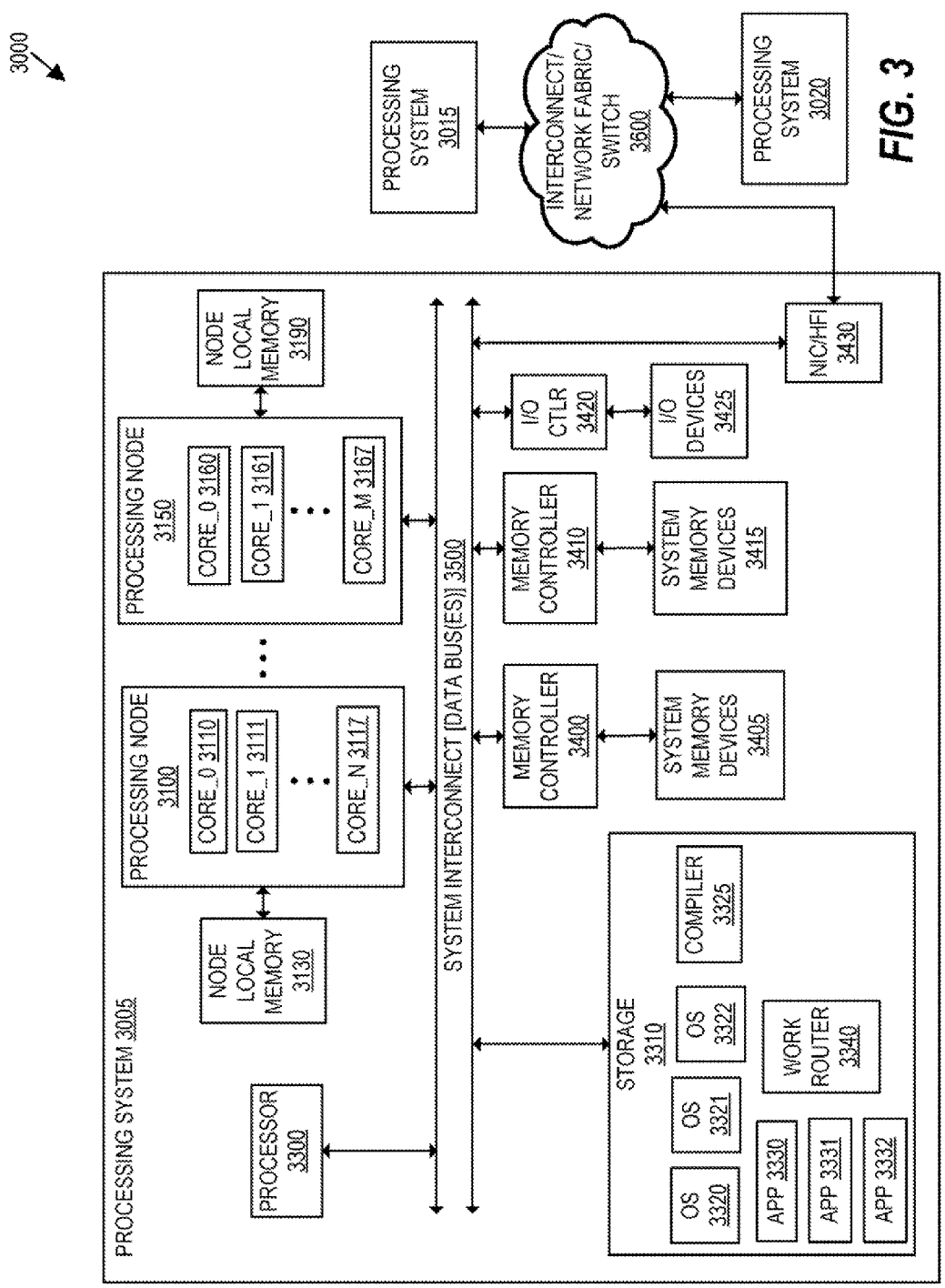
Figure 4:
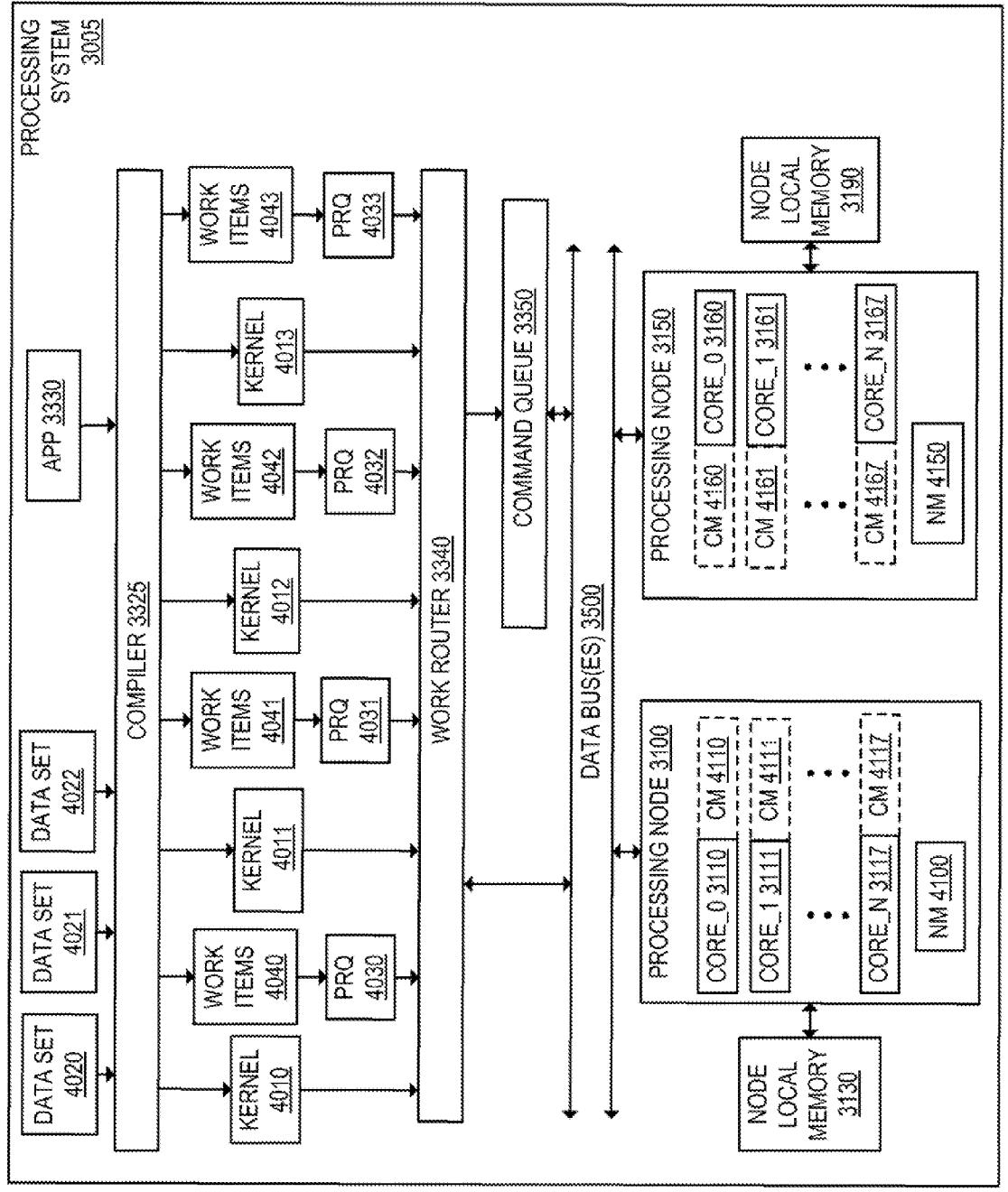
Figure 5:
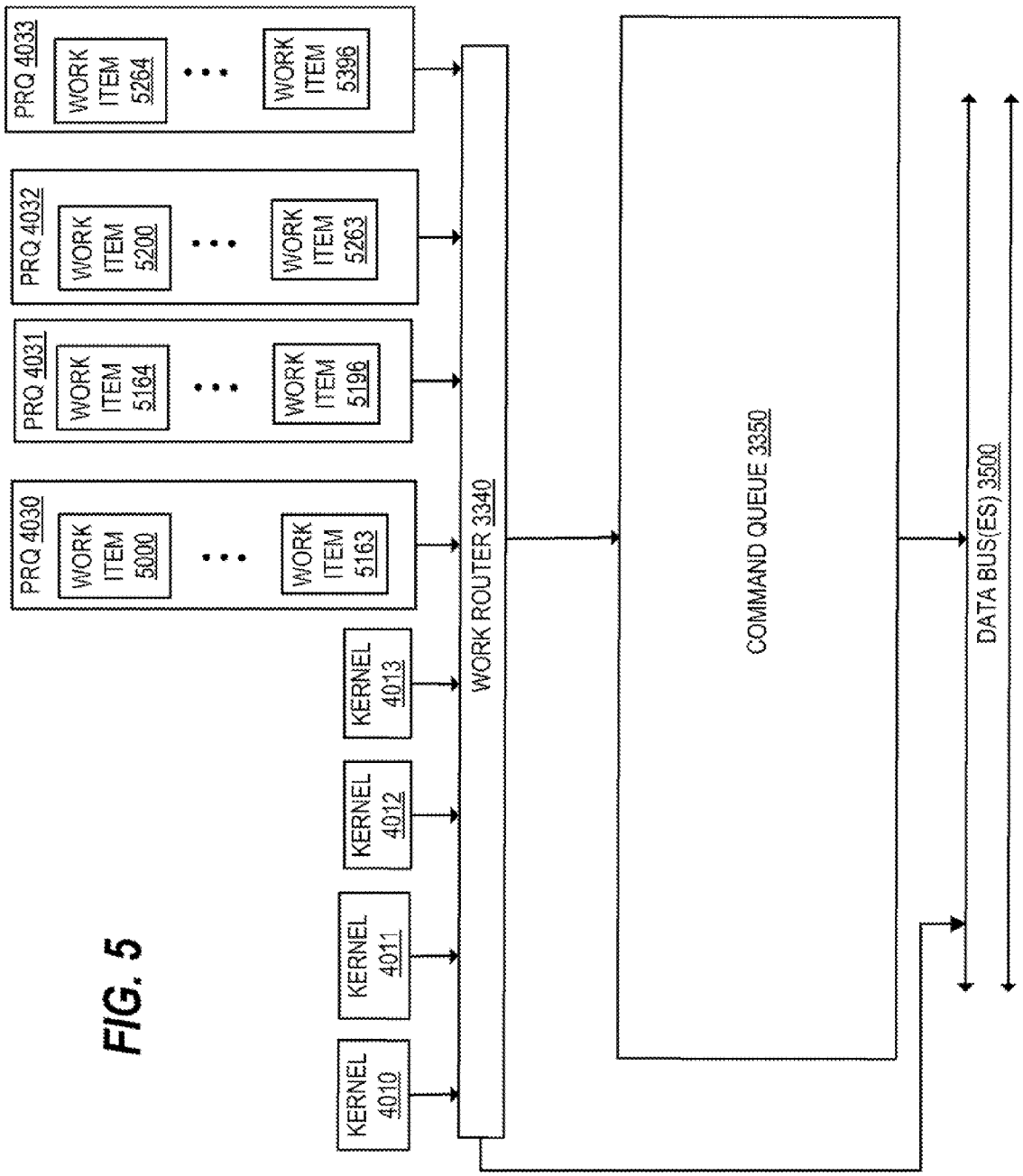
Figure 6:
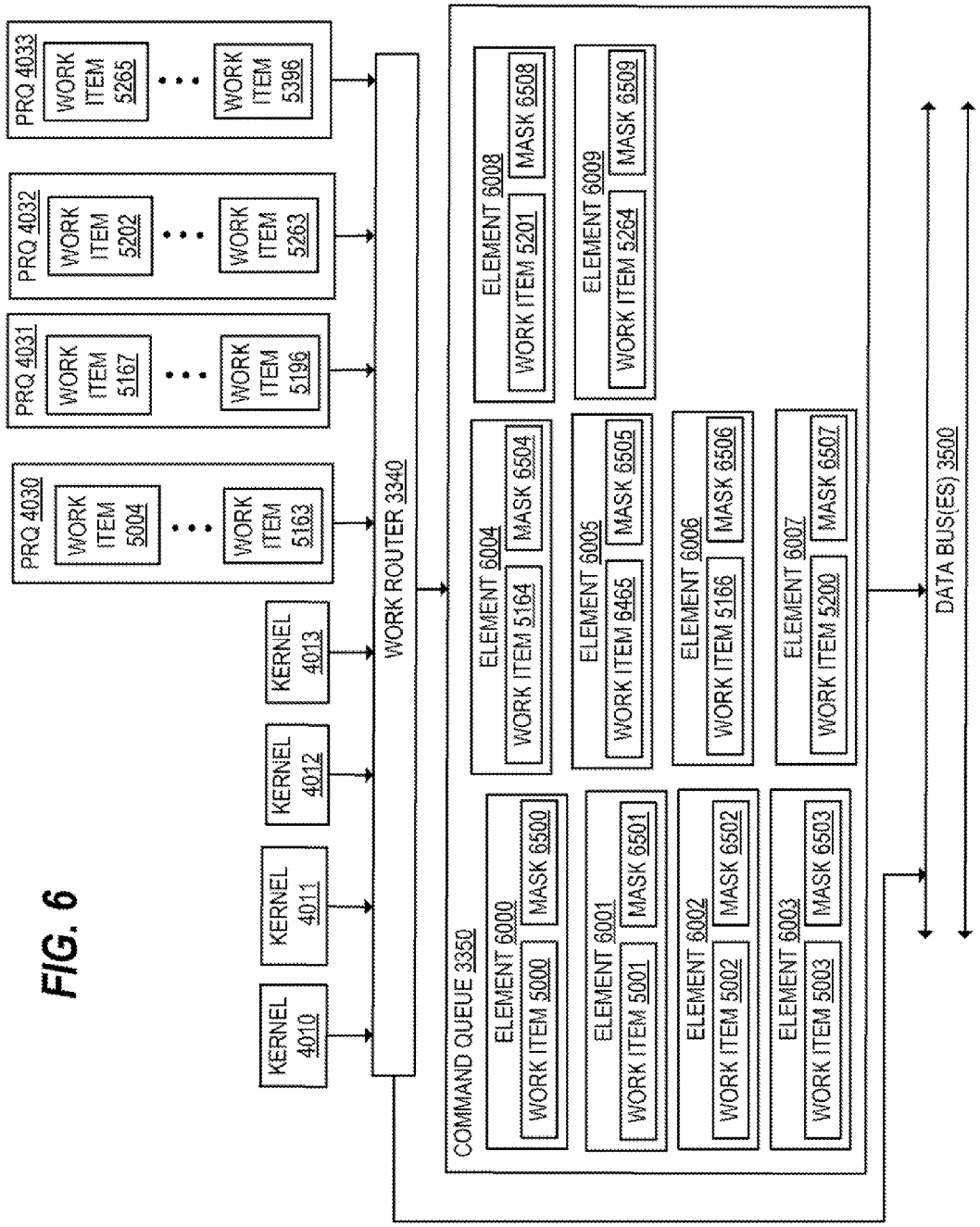
Figure 7:
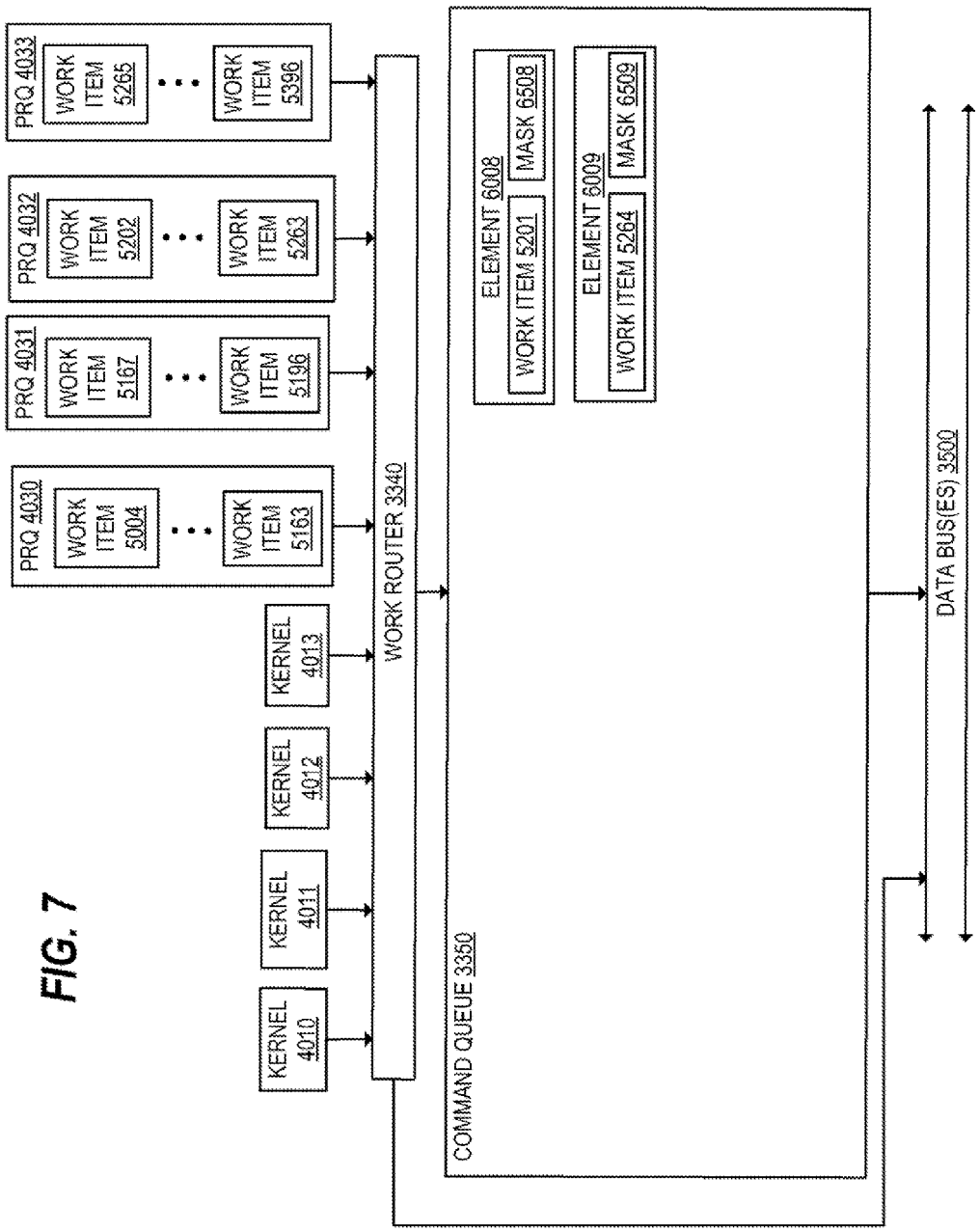
Figure 8:
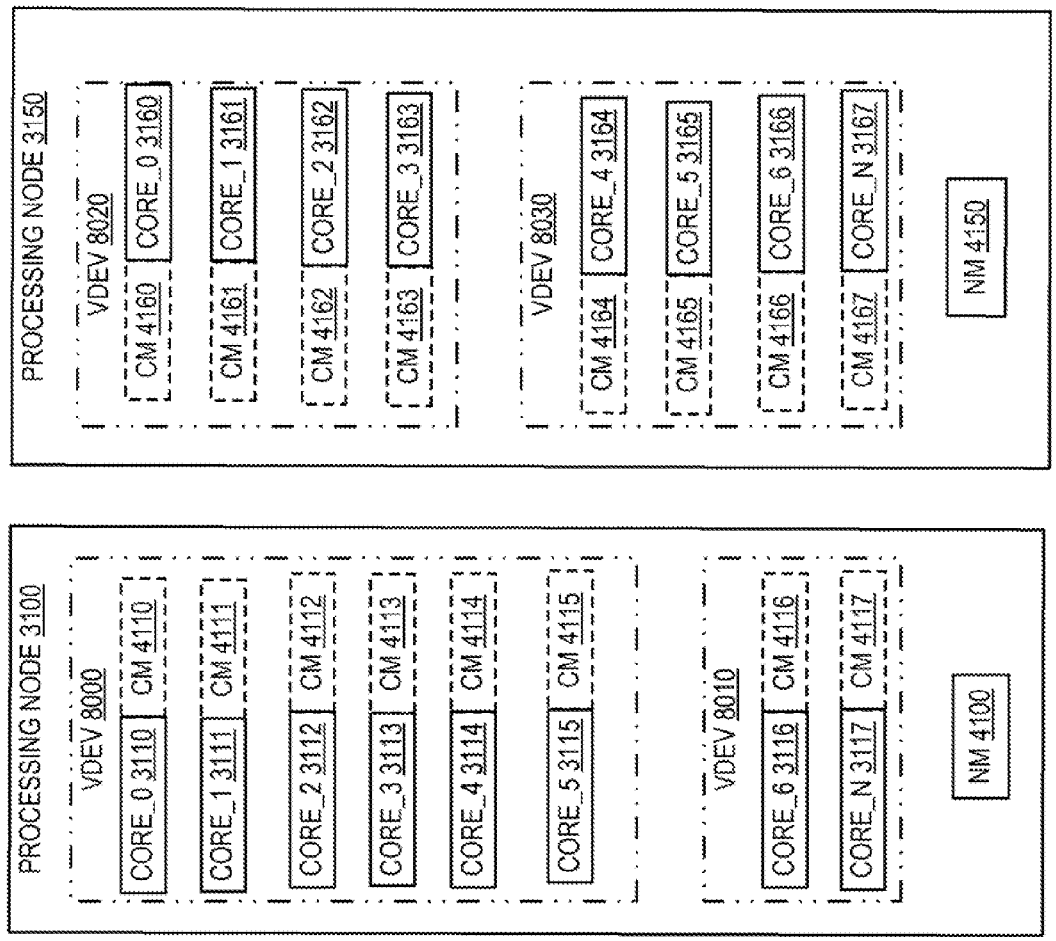
Figure 9:
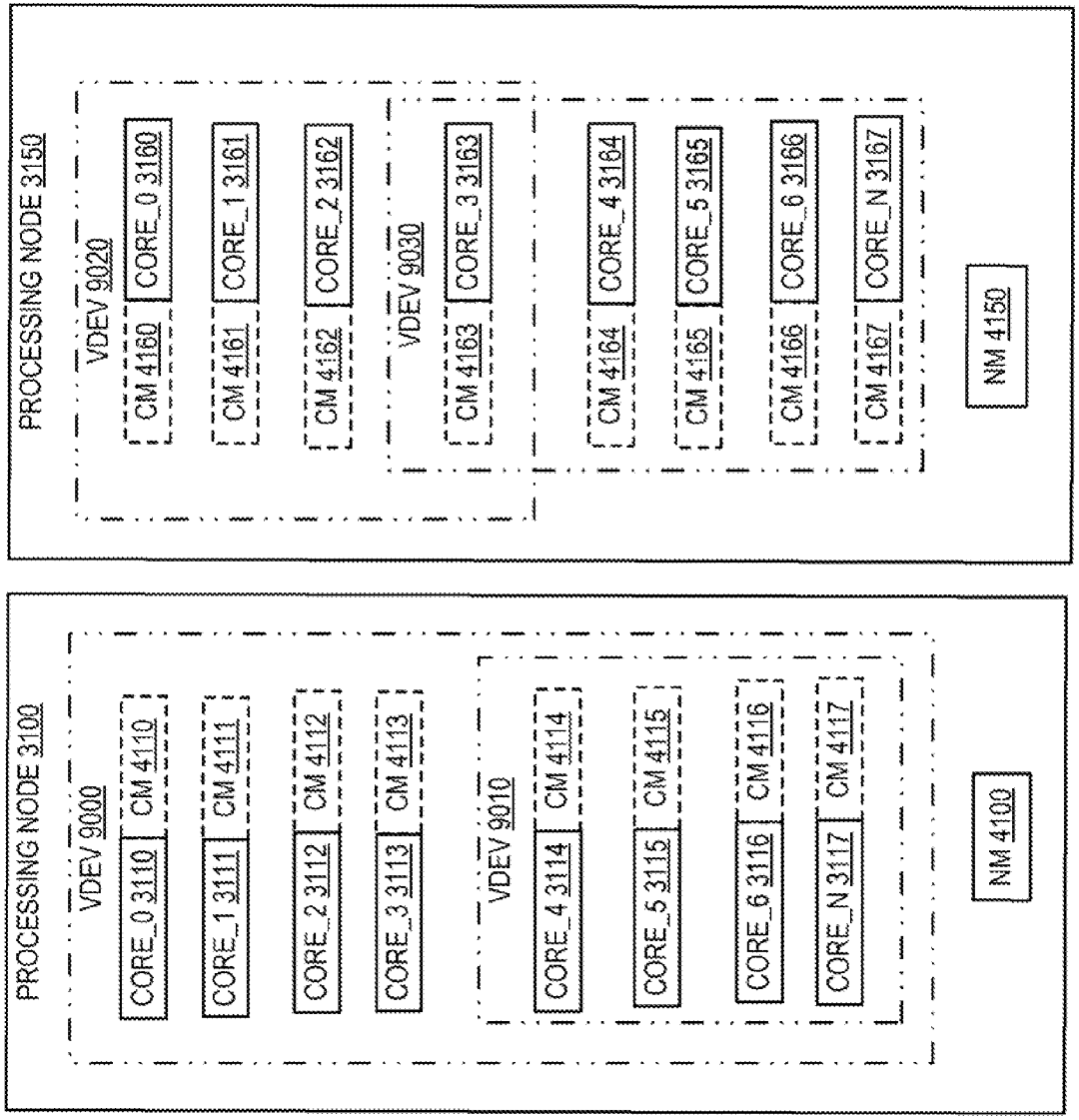
Figure 10:
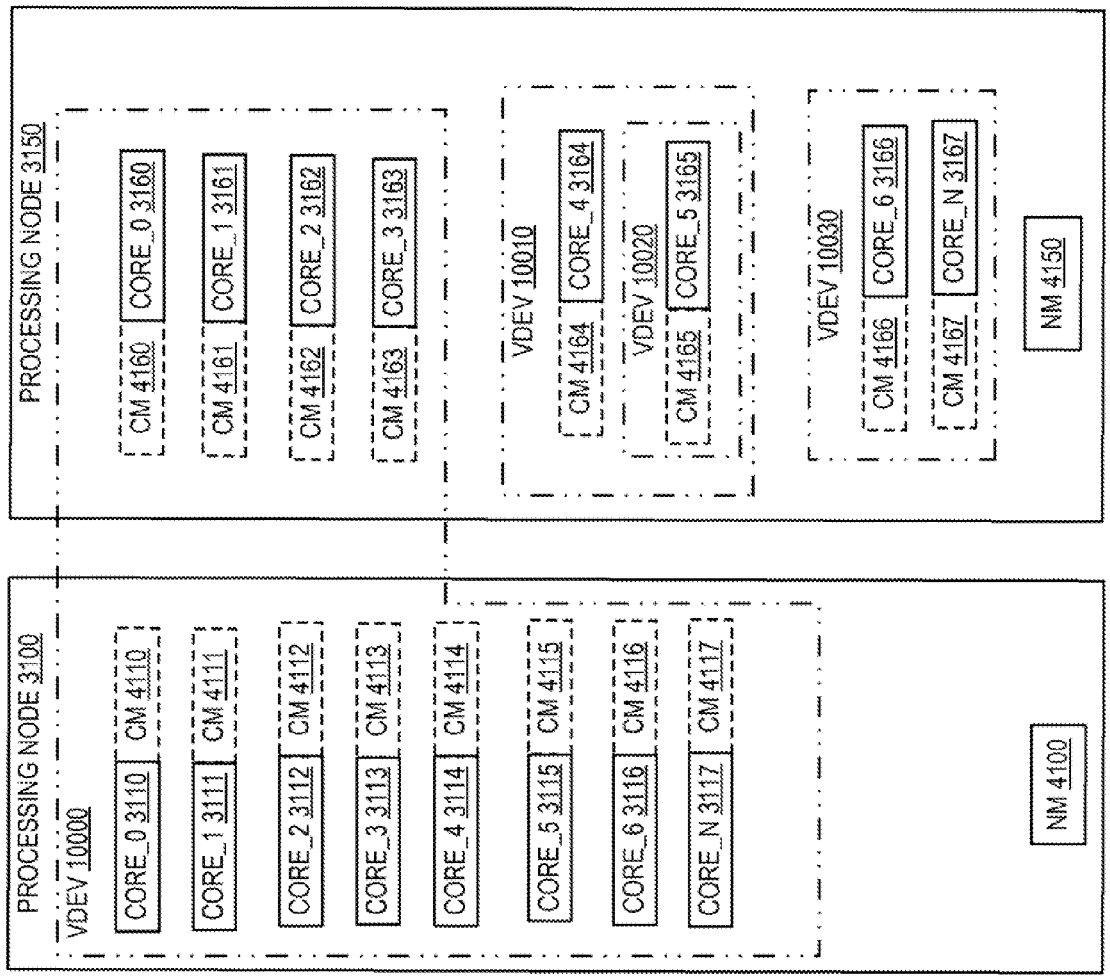
Figure 11:
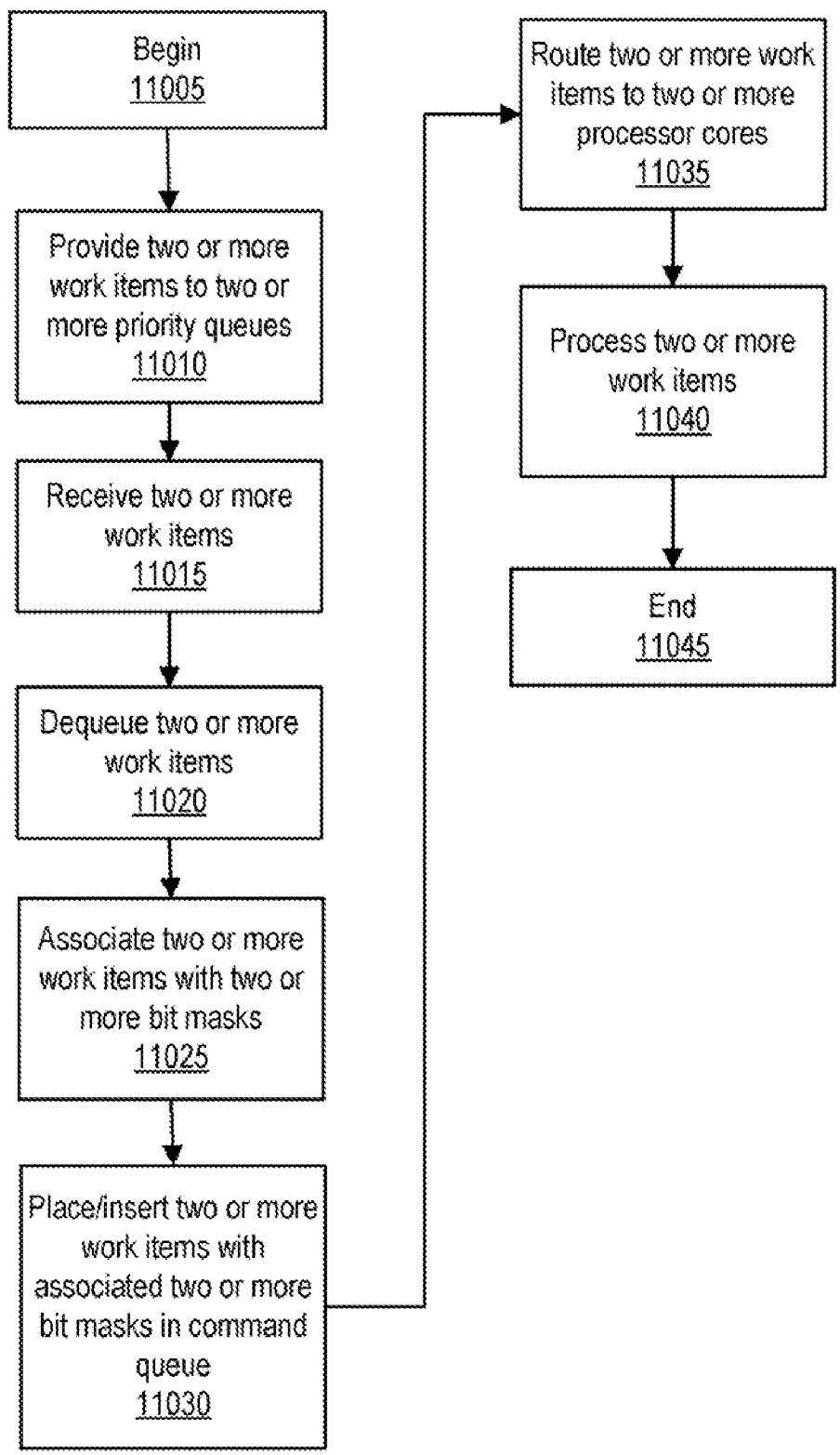

The claimed subject matter and equivalents thereof will best be understood by reference to the following detailed description of illustrative embodiments when read in conjunction with the accompanying figures, wherein:

FIG. 1 provides a prior art block diagram of a single node or compute device that is subdivided into portions such that each portion includes one or more processing elements or processor cores in accordance with a first subdivision process;

FIG. 2 provides a prior art block diagram of a single node or compute device that is subdivided into portions such that the compute device is re-portioned or re-subdivided to re-balance a workload;

FIG. 3 provides a block diagram of a multi-node, distributed data processing system, according to one or more embodiments;

FIG. 4 provides a block diagram of a logical flow of a multi-node data processing system, according to one or more embodiments;

FIG. 5 provides an exemplary block diagram of work items in priority queues, according to one or more embodiments;

FIG. 6 provides an exemplary block diagram of work items in priority queues and work items in a command queue, according to one or more embodiments;

FIG. 7 provides an exemplary block diagram of work items in priority queues and work items in a command queue, according to one or more embodiments;

FIG. 8 provides a block diagram of processing cores that are included in device groupings, according to one or more embodiments;

FIG. 9 provides a block diagram of processing cores that are included in device groupings, according to one or more embodiments;

FIG. 10 provides a block diagram of processing cores that are included in device groupings, according to one or more embodiments; and FIG. 11 illustrates a method for operating a data processing system, according to one or more embodiments.

DETAILED DESCRIPTION

The illustrative embodiments disclose a method, computer system architecture, and computer program product of operating a data processing system that can include or be coupled to multiple processor cores. The multiple processor cores can be coupled to a memory that can include multiple priority queues associated with multiple respective priorities and store multiple work items. Work items stored in the multiple priority queues can be associated with a bit mask which is associated with a respective priority queue and can be routed to respective groups of one or more processors based on the associated bit mask. For example, each of multiple priority queues can respectively receive multiple work items, and work items in each of the priority queues can be associated with a bit mask. In one or more embodiments, the respective bit mask can be used to route the associated work items to a group of one or more processor cores. In one example, routing the work items associated with the respective bit mask to the group of one or more processor cores can include each processor core of the group retrieving the work items associated with the respective bit mask from a data structure stored in a memory. In another example, routing the work items associated with the respective bit mask to the group of one or more processor cores can include a processor or a processing core routing the work items associated with the respective bit mask to the group of one or more processor cores.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. In one or more embodiments, the following terms, which are utilized herein, can be defined as follows:

(1) Work Item: a base element of a data set (e.g., a byte, a string, an integer number, an floating point number, a pixel, an array, a data structure, etc.).
(2) Work Group: a group of work items.
(3) NDRange Size: a number of work items in an index space.
(4) Work Group Size: a number of work items in a work group, where the number divides into a ND Range Size without a remainder.
(5) Kernel: a function that processes a work item to produce a result, where the function is implemented by one or more instructions executable by a processor core.
(6) Kernel Object: a kernel and argument(s) to use when executing the kernel.

As provided herein, the invention is applicable to any number of different configurations of such multi-core systems, including ones configured as large scale parallel processing system, or ones configured as non-uniform memory access (NUMA) processing system, or other type of multi-core processing system, including parallel processing systems. The descriptions provided herein assume no specific architecture, other than a multi-core architecture. However, certain features are assumed implemented in multi-node architectures (i.e., system with multiple processing nodes) in which one or more processing nodes exhibit low latency when accessing a global/shared memory structure, while other features are assumed to be implemented in multi-node architectures in which one or more processing nodes exhibit high latency when accessing the global/shared memory structure.

As further described below, implementation of the functional features of the invention is provided within processing nodes and involves use of a combination of hardware, firmware, as well as several software-level constructs. The presented figures illustrate both hardware and software components within an example distributed, multi-node computing environment in which multiple physically separate processing nodes, interconnected via a general system interconnect and/or a network interface device (NID) and/or host fabric interface (HFI) and/or one or more other forms of interconnects (e.g., switches, and the like), provide a distributed data processing system that executes one or more ND work sets via a plurality of processor cores. The illustrative and described embodiments assume that the system architecture may be scaled to a much larger number of processing nodes.

Turning now to the figures, and in particular to FIG. 3, a block diagram of a multi-node, distributed data processing system (DPS) is illustrated, according to one or more embodiments. As shown, DPS 3000 includes a processing system 3005, which is coupled to one or more remote processing systems 3015 and 3020 via an interconnect 3600, such as a network fabric or switch. A illustrated, processing system 3005 includes two or more processing nodes of which processing nodes 3100 and 3150. Processing nodes 3100 and 3150 are coupled to system interconnect 3500, which serves as and may interchangeably be referred to as data buses.

In one or more embodiments, system interconnect 3500 provides connectivity within processing system 3005 to two or more devices, including memory controllers 3400 and 3410, a storage medium 3310, a processor 3300, and input/output (I/O) controller 3420. In one or more embodiments, I/O controller 3420 provides control over/by one or more I/O devices 3425, such as a pointing device, display monitor, and the like. Memory controllers 3400 and 3410 controls access to respective system memory devices 3405 and 3415. Depending on system design, memory controllers 3400 and 3410 may be assigned to respective processing nodes 3100 or 3150 and/or may be physically located on the processor chip or at some other location within the overall system architecture. It is appreciated that the presence of multiple memory controllers 3400 and 3410 is a design parameter, and processing system 3005 may be configured with a single memory controller, according to one or more embodiments.

In addition to system memory devices 3405 and 3415 of processing system 3005, processing nodes 3100 and 3150 can be coupled to respective associated node local memories 3130 and 3190, which can allow staging of work at the processing node without requiring the processing node to retrieve each piece of work individually from a system memory (e.g., one of system memories 3405 and 3415) or other remote (or high latency) location. Each of processing nodes 3100 and 3150 includes two or more processor cores, although it is possible for the nodes to be single core nodes. As shown, processor node 3100 includes N+1 cores, numbered core_0 though core_N, where N is an integer greater than zero. Likewise, processor node 3150 comprises M+1 cores, numbered core_0 though core_M, where M is an integer greater than zero. So as to simplify the description of one or more embodiments, both N and M are assumed to be integer seven (7), such that processing node 3100 includes eight (8) processing cores 3110-3117 and processing node 3150 includes eight (8) processor cores 3160-3167. Where utilized herein, the term processing units are assumed to be synonymous with processor cores. In one or more embodiments, processor 3300 and/or each processor core of processor cores 3100-3117 and 3160-3167 can implement an instruction set architecture (ISA) and can execute instructions from the ISA. In one or more embodiments, processor 3300 can implement a different ISA than an ISA implemented by processor cores 3100-3117 and/or 3160-3167. In one or more embodiments, processor cores 3100-3117 can implement an ISA that is different than an ISA implemented by processor cores 3160-3167.

The use of the integer variables "N" and "M" to cap the number of processor cores in respective processing nodes 3100 and 3150 merely indicates that each processing node can include a variable number of separate processor cores, with N and M being integers of any size greater than zero (0) (assuming a multi-core implementation for respective processing nodes). The number of processing nodes deployed in a given system architecture is implementation-dependent and can vary. It is appreciated that the embodiments described herein enables scaling to a much larger number of processing nodes and even larger number of processor cores. In one or more embodiments, processing system 3005 can be the source of one or more ND Range work sets that are generated and processed by the processor cores within DPS architecture 3000.

As further illustrated, processing system 3005 includes storage 3310, within which are stored one or more of the firmware and software components that enable generation of work and ND Range work sets for execution by one or more of the processing nodes. In one or more embodiments, storage 3310 can store of or more of one or more operating systems (OSes) 3320-3322, one or more applications (APPs) 3330-3332, a compiler 3325, and a work router 3340. In one or more embodiments, a data set that is to be operated on is retrieved by compiler 3325 from one or more of applications 3330-3332 and/or OSes 3320-3322, or from some other source (not illustrated herein). In one or more embodiments, compiler 3325 includes a just in time (JIT) compiler that can produce one or more kernels in accordance with a method or process associated with processing the data set. For example, application 3300 can implement a method or process associated with processing the data set, and in response to an execution of application 3330, the JIT compiler can produce one or more kernels to process the data set.

In one or more embodiments, processing system 3005 includes or is coupled to a switch or other global interconnect (e.g., interconnect 3600) to which multiple other processing systems may be connected. As illustrated, processing system 3005 is communicatively connected to remote processing systems 3015 and 3020 via interconnect 3600, which may be or include a network fabric or switch. As shown, connection to interconnect 3600 is provided via network interface controller (NIC) 3430, which may be or include a host fabric interface (HFI). As illustrated, NIC 3430 is coupled to system interconnect 3500. Interconnect 3600 may be a single general interconnect to which all nodes connect or may include one or more subnets (not shown) connecting a subset of processing nodes to each other and/or to processing system 3005, in one of several alternate configurations.

In one or more embodiments, one or more of processing systems 3015 and 3020 can provide additional computing resources within DPS 3000. For example, each of processing systems 3015 and 3020 can include one or ore structures and/or functionalities similar to or the same as described with reference to processing system 3005. In one or more embodiments, a relative distance between a remote computing device (e.g., one of processing systems 3015 and 3020) from a work staging area within processing system 3005, one or more processing cores included in the remote computing device can be described as exhibiting high latency during shared work retrieval and/or balancing.

Those skilled in the art will appreciate that DPS architecture 3000 can include additional components, such as interconnect bridges, ports for connection to networks or attached devices, and the like (none of which are illustrated herein).

With reference now to FIG. 4, a block diagram of a logical flow of a multi-node data processing system is illustrated, according to one or more embodiments. In addition to the hardware structure presented processing system 3005 of FIG. 3, which has been previously described, FIG. 4 provides a one or more configurations and/or functionalities of the software and/or firmware components described with reference to FIG. 3 as well, which enable one or more functional features of one or more embodiments.

As shown, processing node 3100 is associated with a node mask (NM) 4100, and processing node 3150 is associated with a NM 4150. In one or more embodiments, each of node masks (NMs) 4100 and 4150 can provide a unique bit mask identifier to identify an associated processing node. In one or more embodiments, node masks are used to enable node level scheduling and/or routing of work, as described further below.

In a similar fashion, a core mask (CM) or processing unit mask (PUM) can provide a bit mask identifier to identify an associated/linked/encoded processing core and to uniquely identify the specific processor core from other processor cores within a node that includes the associated/linked/encoded processing core. As illustrated, cores 3110-3117 are associated with core masks (CMs) 4110-4117, respectively, and cores 3160-3167 are associated with CMs 4160-4167, respectively. For example, core_0 3110 is tagged with bit mask 4110, core_1 3111 is tagged with bit mask 4111, core_N 3117 is tagged with bit mask 4117.

In one example, each of NMs 4100 and 4150 can include a bit mask of $X_0X_1$, where $X_i$, can include values of "0" and "1". For instance, NM 4100 can include a bit mask of "10", and in another instance, NM 4150 can include a bit mask of "01". In another example, each of processor cores 3110-3117 and 3160-3167 can include a bit mask of $Y_0Y_1Y_2Y_3Y_4Y_5Y_6Y_7$, where $Y_j$ can include values of "0" and "1". In one instance, cores 3110 and 3160 can include a bit mask of "10000000". In a second instance, cores 3111 and 3161 can include a bit mask of "01000000". In another instance, cores 3117 and 3167 can include a bit mask of "00000001". In one or more embodiments, individual processing cores can be addressed and/or identified by a combination of node mask and core mask. In one example, a processing core can be identified by $X_0X_1Y_0Y_1Y_2Y_3Y_4Y_5Y_6Y_7$ or $Y_0Y_1Y_2Y_3Y_4Y_5Y_6Y_7X_0X_1$, depending on implementation. In one or more embodiments, processing system 3005 can include multiple nodes that can be associated with multiple node masks. In one example, each of the multiple node masks, associated with multiple processor cores, can include $X_0 \ldots X_p$, where P can be an integer greater than zero (0). In one or more embodiments, each of multiple processing nodes can include multiple processing cores that can be associated with multiple core masks. In one example, each of the multiple core masks can include $Y_0 \ldots Y_Q$, where Q can be an integer greater than zero (0).

Turning now to the functional blocks in the upper portion of the figure, the executable/execution code of example application 3330 is forwarded to compiler 3325, which processes the instructions/codes to one or more generate commands and/or one or more kernels 4010-4013 and/or one or more work items 4040-4043 from one or more of data sets 4020-4021, according to one or more embodiments. For example, the one or more commands can provide work divided into one or more work items 4040-4043, each associated with a kernel (e.g., a kernel of kernels 4010-4013) and with a priority queue (e.g., a priority queue of priority queues 4030-4033). In one or more embodiments, prioritizing work items to a priority queue can be associated with a function (e.g., sound processing, video processing, position processing, etc.).

In one or more embodiments, each of priority queues 4030-4033 is assigned a priority level, and work items in priority queues 4030-4033 can be placed in command queue 3350 based respective priority levels of priority queues 4030-4033. In one example, a process or method for directing transfers of work items to priority queues 4030-4033 can include a weighted round robin process or method. In another example, the process or method for directing transfers of work items to priority queues 4030-4033 can include servicing higher priority queue before servicing lower priority queues. For instance, priority queue 4030 may have a higher priority than priority queue 4031, and all work items in priority queue 4030 may be transferred to command queue 3350 before one or more work items in priority queue 4031 may be transferred to command queue 3350.

In one or more embodiments, prioritizing work items can be based on one or more prioritization criteria that takes into account workload allocation and work balancing across the system architecture, processing capabilities of the different types of processing units, e.g., CPUs (central processing units), GPUs (graphical processing units), SPUs (stream processing units), etc., and other factors, which may be programmed and/or configured by the designer of the scheduler. In one or more embodiments, an application (e.g., application 3330) directs compiler 3325 in placement of work items in priority queues 4030-4033. In one example, the application directs placement of sound work items in priority queue 4030. In a second example, the application directs placement of video work items in priority queue 4031. In another example, the application directs placement of position work items in priority queue 4032.

In one or more embodiments, work router 3340 dequeues work items from priority queues 4030-4033 and directs/places/routes the work items to command queue 3350. For example, work router 3340 dequeues one or more work items priority queue (PRQ) 4030, associates the one or more work items with a bit mask, and places/inserts the work items and the associated bit mask to command queue 3350. For instance, the bit mask can include a core mask or a combination of a core mask and a node mask. In one or more embodiments, the work items associated with the bit mask can be routed from command queue 3350 to one or more processing cores via the associated bit mask. In one example, the work items associated with the bit mask can be routed from command queue 3350 to the one or more cores via the associated bit mask by a processor (e.g., core 3100, core 3160, processor 3300, etc.). In another example, the work items associated with the bit mask can be routed from command queue 3350 to the one or more cores via the associated bit mask by the one or more cores retrieving the one or more work items from command queue 3350 using the associated bit mask.

Turning now to FIG. 5, an exemplary block diagram of work items in priority queues is illustrated, according to one or more embodiments. As shown, priority queue 4030 can include work items 5000-5163, priority queue 4031 can include work items 5164-5196, priority queue 4032 can include work items 5200-5263, and priority queue 4030 can include work items 5264-5396. As illustrated, no work items have been transferred to command queue 3350.

Turning now to FIG. 6, an exemplary block diagram of work items in priority queues and work items in a command queue is illustrated, according to one or more embodiments. As shown, work items 5000-5003, 5164-5166, 5200, 5201, and 5264 have been transferred from priority queues 4030-4033 to command queue 3350 by work router 3340. As shown, queue elements 6000-6003 include respective work items 5000-5003 and respective bit masks 6500-6503, queue elements 6004-6006 include respective work items 5164-5166 and respective bit masks 6504-6506, queue elements 6007 and 6008 include respective work items 5200 and 5201 and respective bit masks 6507 and 6508, and queue element 6009 can include work item 5264 and bit mask 6509. In one or more embodiments, queue elements can be processed in a first in first out (FIFO) fashion. For example, a first process core of processor cores 3110-3117 can receive work item 5000 from command queue 3350, and a second process core of processor cores 3110-3117 can receive work item 5001 from command queue 3350.

In one or more embodiments, a bit mask (e.g., bit mask 6500) can be used to determine which processor core processes a work item. In one example, bit mask 6500 can be used to route work 5000 item to a first process or processors 3110-3117, and bit mask 6504 can be used to route work item 5164 to a second process or processors 3110-3117. In a second example, masks 6500-6503 can be used to route respective work items 5000-5003 to processor cores 3110-3113, respectively. In a third example, masks 6504-6506 can be used to route respective work items 5164-5166 to processor cores 3114-31166, respectively. In another example, mask 6507 can be used to route work item 5200 to processor core 3117. In these examples, at least one of work items 5201 and 5264 may not be routed to at least one of processor cores 3110-3117 until after at least one work item associated with a bit mask of bit masks 6500-6507 has finished processing a respective work item.

As illustrated, four (4) work items from priority queue 4030, three (3) work items from priority queue 4031, two (2) work items from priority queue 4032, and one (1) work item from priority queue 4033 were transferred to command queue 3350. In one example, these transfers can be based on a process or method that includes or is a weighted round robin process or method. In one instance, the weighted round robin process or method can allocate one or more of a first percentage of the processor cores to a first priority queue, a second percentage of the processor cores to a second priority queue, a third percentage of the processor cores to a third priority queue, and a fourth percentage of the processor cores to a fourth priority queue. In another instance, the weighted round robin process or method can transfer one or more of a first percentage of work items from a first priority queue, a second percentage of work items from a second priority queue, third percentage of the processor cores to a third priority queue, and a fourth percentage of the processor cores to a fourth priority queue to a command queue. In another example, these transfers can be based on a process or method that includes or uses one or more ratios. For instance, the ratio for priority queue 4030 to priority queue 4031 can be 4:3, the ratio for priority queue 4031 to priority queue 4032 can be 3:2, the ratio for priority queue 4032 to priority queue 4033 can be 2:1, the ratio for priority queue 4030 to priority queue 4032 can be 2:1, and/or the ratio for priority queue 4030 to priority queue 4033 can be 4:1, among others.

In one embodiment, an application (e.g., application 3330) and/or an operating system (e.g., OS 3320) can modify and/or change a process or method and/or one or more ratios and/or one or more priority levels that are used to determine work item transfers from priority queues 4030-4033 to command queue 3350. For example, the process or method and/or the one or more ratios and/or one or more priority levels that are used to determine work item transfers from priority queues 4030-4033 to command queue 3350 can be modified and/or changed while processing a data set or can be modified between processing two data sets.

Turning now to FIG. 7, an exemplary block diagram of work items in priority queues and work items in a command queue is illustrated, according to one or more embodiments. As illustrated, queue elements 6008 and 6009 remain in command queue 3350. In one or more embodiments, command queue 3350 includes a FIFO structure and/or functionality. As such, command queue 3350 is illustrated in FIG. 7 with queue elements 6008 and 6009 after the first eight queue elements 6000-6007 have been dequeued/routed/retrieved.

In one or more embodiments, using priority queues to route work items to one or more processing cores can be used to implement one or more node portions, partitions, and/or subdevices. Further details regarding these one or more embodiments are provided below.

Turning now to FIG. 8, a block diagram of processing cores that are included in device groupings is illustrated, according to one or more embodiments. As illustrated, a virtual device (VDEV) 8000 can include processing cores 3110-3115 with respective associated core masks 4110-4115, VDEV 8010 can include cores 3116 and 3117 with respective core masks 4116 and 4117, VDEV 8020 can include cores 3160-3163 with respective core masks 4160-4163, and VDEV 8030 can include cores 3164-3167 with respective core masks 4164-4167. As used herein, a node (e.g., node 3100) can be referred to as a compute device that can be portioned into two or more logical subdevices or virtual devices (VDEVs). Partitioning a compute device (e.g., a node) into two or more virtual devices can be implemented using two or more priority queues (e.g., two or more of priority queues 4030-4033), according to one or more embodiments. For example, VDEVs 8000-8030 can process work items from respective priority queues 4030-4033.

In one or more embodiments, a bit mask (e.g., bit mask 6500) can be used to determine a possible processor core of two or more processor cores processes a work item. For example, bit mask 6500 can include a bit mask of "1111110". In one instance, work item 5000 associated with bit mask 6500 can be routed to any of processing cores 3110-3115. In a second instance, any of processing cores 3110-3115 can retrieve work item 5000 associated with bit mask 6500. In one example, processing core 3110 can retrieve work item 5000 associated with bit mask 6500, since a bit mask that identifies processing core 3110 corresponds to or is included in bit mask 6500. In a second example, processing core 3110 can retrieve work item 5000 associated with bit mask 6500 by comparing CM 4110 with bit mask 6500 to determine that CM 4110 corresponds with or is include in bit mask 6500. In either of these instances, VDEV 8000 can process work item 5000 associated with bit mask 6500.

In one or more embodiments, VDEVs can share one or more processing cores. Further details regarding these one or more embodiments are provided below.

Turning now to FIG. 9, a block diagram of processing cores that are included in device groupings is illustrated, according to one or more embodiments. As illustrated, a VDEV 9000 can include processing cores 3110-3117 with respective core masks 4110-4117, VDEV 9010 can include cores 3114-3117 with respective core masks 4114-4117, VDEV 9020 can include cores 3160-3163 with respective core masks 3160-3163, and VDEV 9030 can include cores 3163-3167 with respective core masks 4163-4167. Partitioning a compute device (e.g., a node) into two or more virtual devices can be implemented using two or more priority queues (e.g., two or more of priority queues 4030-4033), according to one or more embodiments. For example, VDEVs 9000-9030 can process work items from respective priority queues 4030-4033.

In one or more embodiments, VDEVs can share one or more nodes. Further details regarding these one or more embodiments are provided below.

Turning now to FIG. 10, a block diagram of processing cores that are included in device groupings is illustrated, according to one or more embodiments. As illustrated, a VDEV 10000 can include processing cores 3110-3117 and 3160-3163 with respective core masks 4110-4117 and 4160-4163. In one or more embodiments, VDEV 10000 can be implemented using a combination of node mask 4100 with core masks 4110-4117 and a combination of node mask 4150 and core masks 4160-4163. As shown, VDEV 10010 can include cores 3164 and 3165 with respective core masks 4164 and 4165, VDEV 10020 can include core 4165 with respective core mask 4165, and VDEV 10030 can include cores 3166 and 3167 with respective core masks 4166 and 4167. In one or more embodiments, VDEVs 10000-10030 can process work items from respective priority queues 4030-4033.

Turning now to FIG. 11, a method for operating a data processing system is illustrated, according to one or more embodiments. The method begins at initiation block 11005. At block 11010, compiler 3325 provides two or more of work items 5000-5396 to two or more of priority queues 4030-4033. At block 11015, the two or more of work items 5000-5396 can be received by two or more of priority queues 4030-4033. At block 11020, work router 3340 can dequeue the two or more of work items 5000-5396. At 11025, work router 3340 can associate the two or more of work items 5000-5396 with two or more bit masks. At 11030, work router 3340 can place or insert the two or more of work items 5000-5396 with the associated two or more bit masks in command queue 3350.

At block 11035, the two or more of work items 5000-5396 can be routed from command queue 3350 to two or more of processor cores 3110-3117 and 3160-3167 based on the associated two or more bit masks. In one example, processor 3300 or a processor core of processor cores 3110-3117 and 3160-3167 can route the two or more of work items 5000-5396 from command queue 3350 to two or more of processor cores 3110-3117 and 3160-3167. In another example, the two or more of work items 5000-5396 can be routed from command queue 3350 to two or more of processor cores 3110-3117 and 3160-3167 by at least two of processor cores 3110-3117 and 3160-3167 retrieving the two or more of work items 5000-5396 from command queue 3350 based on the associated two or more bit masks.

At block 11040, two or more of processor cores 3110-3117 and 3160-3167 can process the two or more of work items 5000-5396 to produce two or more results. In one example, the two or more of processor cores 3110-3117 and 3160-3167 can process the two or more of work items 5000-5396 by executing kernel 4010 to produce the two or more results. In another example, the two or more of processor cores 3110-3117 and 3160-3167 can process the two or more of work items 5000-5396 by executing kernels 4010 and 4011, respectively, to produce the two or more results. The method then ends at block 11045.

Features of the provided embodiments can advantageously be implemented in multi-node processing systems which exhibit low data transfer and cross communication latencies between the processor cores and a memory location of a DPS. Given that the nodes can retrieve work from the central/common command queue, the latency to the command queue for the different nodes can be relative short, such that the overall work retrieval process incurs an acceptable latency penalty in overall processing time for the processing cores that are grabbing work from the command queue.

With the implementation of the single command queue, the need to synchronize across multiple command queues of multiple nodes is substantially eliminated and can allow for dynamic allocation of various subdevices or virtual devices. The described embodiments are adapted for implementation on multi-processor compute systems (or system architecture) that exhibit small penalty (latency) when synchronizing across compute nodes. For example, with NUMA nodes that are connected via a "local" fabric, such as within a single physical system (e.g., processing system 3005), there is a relatively small latency penalty when synchronizing distributed work of a single kernel and work items across multiple nodes. This further enables the expanding/implementing of work and data intensive operations to/on NUMA systems with low cross node latency.

With the described embodiments, multiple individual command queues tied to separate nodes may not be required for NUMA affinity, and a single command queue structure is provided. With the single command queue implementation.

One or more features of the described embodiments may lend themselves to N Dimensional (ND) Range processing/execution paradigms, such as provided by OpenCL™ and similarly structured applications executed on multi-core data processing systems in which an execution command contains the information necessary to efficiently execute and balance work load of the command, which may include data or task parallel processing requirements. Each command includes information corresponding to the total number of work groups within the command to be executed, the number of work groups remaining to be computed, the number of work groups already processed, the number of work groups to process at a time (reservation size). Other information provided by the commands may include the number of execution threads to process in the command and the number of execution threads that have seen the command.

Within this execution paradigm, and according to the presently described embodiments, execution units can process the commands from a single global command queue comprising multiple queue entries. As provided by the described embodiments, the execution units are processing cores, which may be located across a distributed network. However, while processor cores are employed throughout the described and illustrative embodiments as examples of execution units, in other embodiments, the execution units may be any device that executed a command, including, but not limited to, processing cores, CPUs, GPUs, SPUs, threads, and even complete computing systems.

In each of the flow charts above, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of operating a data processing system, comprising:

receiving, from a compiler, a plurality of work items at a plurality of priority queues, wherein each of the plurality of priority queues is assigned a priority level;

associating a first portion of the plurality of work items received at a first priority queue of the plurality of priority queues with at least a first bit mask, wherein the at least the first bit mask is associated with the first priority queue;

associating a second portion of the plurality of work items received at a second priority queue of the plurality of priority queues with at least a second bit mask, wherein the at least the second bit mask is associated with the second priority queue;

routing, based on the at least the first bit mask, the first portion of the plurality of work items received at the first priority queue of the plurality of priority queues to a first plurality of processor cores;

routing, based on the at least the second bit mask, the second portion of the plurality of work items received at the second priority queue of the plurality of priority queues to a second plurality of processor cores;

processing the first portion of the plurality of work items on the first plurality of processor cores; and processing the second portion of the plurality of work items on the second plurality of processor cores.

2. The method of claim 1, wherein the routing, based on the at least the first bit mask, the first portion of the plurality of work items received at the first priority queue of the plurality of priority queues to the first plurality of processor cores further comprises at least one processor core of the first plurality of processor cores retrieving, based on at least the first bit mask, at least one work item of the first portion of the plurality of work items received at the first priority queue.

3. The method of claim 1, wherein:
at least one processor core of the first plurality of processor cores is included in the second plurality of processor cores; and
a bit mask identifies a specific plurality of processors to be used to process a work item.

4. The method of claim 1,
wherein the first priority queue is associated with a first priority level;
wherein the second priority queue is associated with a second priority level, wherein the second priority level is different than the first priority level; and
wherein the associating the first portion of the plurality of work items received at the first priority queue of the plurality of priority queues with the at least the first bit mask is based on the first priority level.

5. The method of claim 1, further comprising:
routing a third portion of the plurality of work items received at the first priority queue of the plurality of priority queues to a third plurality of processor cores.

6. The method of claim 5,
wherein the first priority queue is associated with a first priority level;
wherein the second priority queue is associated with a second priority level, wherein the second priority level is different than the first priority level; and
wherein the associating the first portion of the plurality of work items received at the first priority queue of the plurality of priority queues with the at least the first bit mask is based on the first priority level;
the method further comprising:
modifying the first priority level;
wherein the routing the third portion of the plurality of work items received at the first priority queue of the plurality of priority queues to the third plurality of processor cores is based on the modified first priority level.

7. The method of claim 5, further comprising:
associating the third portion of the plurality of work items received at the first priority queue of the plurality of priority queues with at least a third bit mask, wherein the at least the third bit mask is different from the at least the first bit mask;
wherein the routing the third portion of the plurality of work items received at the first priority queue of the plurality of priority queues to the third plurality of processor cores is based on the at least the third bit mask.

8. The method of claim 1,
wherein a first node includes a first portion of the first plurality of processor cores; and
wherein a second node includes a second portion of the first plurality of processor cores and the second plurality of processor cores, wherein the second node is different from the first node.

9. An article of manufacture embodied as a computer program product comprising:
a computer readable storage medium; and
program code on the computer readable storage medium that when executed by a processor, provides a method of operating a data processing system, the method comprising:
receiving, from a compiler, a plurality of work items at a plurality of priority queues, wherein each of the plurality of priority queues is assigned a priority level;
associating a first portion of the plurality of work items received at a first priority queue of the plurality of priority queues with at least a first bit mask, wherein the at least the first bit mask is associated with the first priority queue;
associating a second portion of the plurality of work items received at a second priority queue of the plurality of priority queues with at least a second bit mask, wherein the at least the second bit mask is associated with the second priority queue;
routing, based on the at least the first bit mask, the first portion of the plurality of work items received at the first priority queue of the plurality of priority queues to a first plurality of processor cores;
routing, based on the at least the second bit mask, the second portion of the plurality of work items received at the second priority queue of the plurality of priority queues to a second plurality of processor cores;
processing the first portion of the plurality of work items on the first plurality of processor cores; and
processing the second portion of the plurality of work items on the second plurality of processor cores.

10. The article of manufacture of claim 9, wherein the routing, based on the at least the first bit mask, the first portion of the plurality of work items received at the first priority queue of the plurality of priority queues to the first plurality of processor cores includes at least one processor core of the first plurality of processor cores retrieving, based on the at least the first bit mask, at least one work item of the first portion of the plurality of work items received at the first priority queue.

11. The article of manufacture of claim 9, wherein:
at least one processor core of the first plurality of processor cores is included in the second plurality of processor cores; and
a bit mask identifies a specific plurality of processors to be used to process a work item.

12. The article of manufacture of claim 9,
wherein the first priority queue is associated with a first priority level;
wherein the second priority queue is associated with a second priority level, wherein the second priority level is different than the first priority level; and
wherein the associating the first portion of the plurality of work items received at the first priority queue of the plurality of priority queues with the at least the first bit mask is based on the first priority level.

13. The article of manufacture of claim 9, wherein the program code further comprising code that executes to provide additional method functions comprising:

routing a third portion of the plurality of work items received at the first priority queue of the plurality of priority queues to a third plurality of processor cores.

14. The article of manufacture of claim 13,
wherein the first priority queue is associated with a first priority level;
wherein the second priority queue is associated with a second priority level, wherein the second priority level is different than the first priority level;
wherein the associating the first portion of the plurality of work items received at the first priority queue of the plurality of priority queues with the at least the first bit mask is based on the first priority level;
wherein the program code further comprising code that executes to provide additional method functions comprising:
modifying the first priority level; and
wherein the routing the third portion of the plurality of work items received at the first priority queue of the plurality of priority queues to the third plurality of processor cores is based on the modified first priority level.

15. The article of manufacture of claim 13, wherein the program code further comprising code that executes to provide additional method functions comprising:
associating the third portion of the plurality of work items received at the first priority queue of the plurality of priority queues with at least a third bit mask, wherein the at least the third bit mask is different from the at least the first bit mask;
wherein the routing the third portion of the plurality of work items received at the first priority queue of the plurality of priority queues to the third plurality of processor cores is based on the at least the third bit mask.

16. The article of manufacture of claim 9,
wherein a first node includes a first portion of the first plurality of processor cores; and
wherein a second node includes a second portion of the first plurality of processor cores and the second plurality of processor cores, wherein the second node is different from the first node.

17. A data processing system, comprising:
a processing unit;
a memory coupled to the processing unit;
a first node that includes a plurality of processing cores coupled to the memory; and
a program code executing on the processor that enables the data processing system to:
receive, from a compiler, a plurality of work items at a plurality of priority queues implemented in the memory, wherein each of the plurality of priority queues is assigned a priority level;
associate a first portion of the plurality of work items received at a first priority queue of the plurality of priority queues with at least a first bit mask, wherein the at least the first bit mask is associated with the first priority queue; and
associate a second portion of the plurality of work items received at a second priority queue of the plurality of priority queues with at least a second bit mask, wherein the at least the second bit mask is associated with the second priority queue;
route, based on the at least the first bit mask, the first portion of the plurality of work items received at the first priority queue of the plurality of priority queues to a first plurality of processor cores of the first node;
route, based on the at least the first bit mask, the second portion of the plurality of work items received at the second priority queue of the plurality of priority queues to a second plurality of processor cores of the first node;
process the first portion of the plurality of work items on the first plurality of processor cores; and
processing the second portion of the plurality of work items on the second plurality of processor cores.

18. The data processing system of claim 17, wherein the program code for routing, based on the at least the first bit mask, the first portion of the plurality of work items received at the first priority queue of the plurality of priority queues to the first plurality of processor cores includes program code that enables the data processing system to:
at least one processor core of the first plurality of processor cores retrieve, based on the at least the first bit mask, at least one work item of the first portion of the plurality of work items received at the first priority queue.

19. The data processing system of claim 17, wherein:
at least one processor core of the first plurality of processor cores is included in the second plurality of processor cores; and
a bit mask identifies a specific plurality of processors to be used to process a work item.

20. The data processing system of claim 17,
wherein the first priority queue is associated with a first priority level;
wherein the second priority queue is associated with a second priority level, wherein the second priority level is different than the first priority level; and
wherein the associating the first portion of the plurality of work items received at the first priority queue of the plurality of priority queues with the at least the first bit mask is based on the first priority level.

21. The data processing system of claim 17, the program code further comprising code that enables the data processing system to:
route a third portion of the plurality of work items received at the first priority queue of the plurality of priority queues to a third plurality of processor cores of the first node.

22. The data processing system of claim 17,
wherein the first priority queue is associated with a first priority level;
wherein the second priority queue is associated with a second priority level, wherein the second priority level is different than the first priority level;
wherein the associating the first portion of the plurality of work items received at the first priority queue of the plurality of priority queues with the at least the first bit mask is based on the first priority level; and
the program code further comprising code that enables the data processing system to:
modifying the first priority level;
wherein the routing the third portion of the plurality of work items received at the first priority queue of the plurality of priority queues to the third plurality of processor cores is based on the modified first priority level.

23. The data processing system of claim 22, the program code further comprising code that enables the data processing system to:
associate the third portion of the plurality of work items received at the first priority queue of the plurality of priority queues with at least a third bit mask, wherein the at least the third bit mask is different from the at least the first bit mask;

wherein the routing the third portion of the plurality of work items received at the first priority queue of the plurality of priority queues to the third plurality of processor cores is based on the at least the third bit mask.

* * * * *